(No Model.)
T. HOLDSWORTH.
COMBINED ERASER AND KNIFE.
No. 336,112. Patented Feb. 16, 1886.
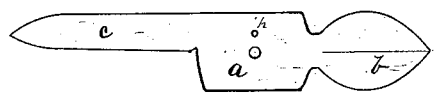
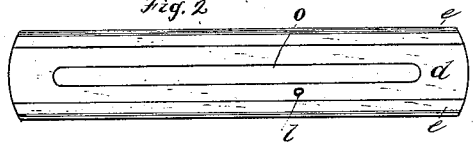 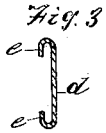
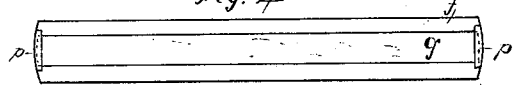
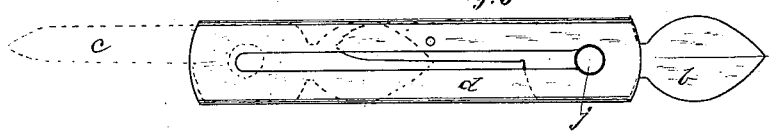
WITNESSES:
Joseph B. Hamilton
Fred Brown
INVENTOR
Thomas Holdsworth
BY Allen Webster
ATTORNEY

UNITED STATES PATENT OFFICE.

THOMAS HOLDSWORTH, OF ELYRIA, OHIO.

COMBINED ERASER AND KNIFE.

SPECIFICATION forming part of Letters Patent No. 336,112, dated February 16, 1886.

Application filed October 12, 1885. Serial No. 179,622. (No model.)

*To all whom it may concern:*

Be it known that I, THOMAS HOLDSWORTH, a citizen of the United States, residing in Elyria, in the county of Lorain and State of Ohio, have invented new and useful Improvements in a Combined Eraser and Knife, of which the following is a specification, reference being had to the accompanying drawings, in which like letters of reference indicate like parts.

Figure 1 is a side view of the blade. Fig. 2 is a side, and Fig. 3 an end, view of a part of the handle. Figs. 4 and 5 are side and edge views of the remainder of the handle with spring. Fig. 6 is a side view of the complete device having the eraser projecting from the handle. Fig. 7 is a side view of the complete device having the blade drawn into the handle, and Fig. 8 is a sectional edge view of the same.

The handle is made of sheet metal or other suitable material, being preferably constructed as illustrated in the drawings, the portion $d$ being bent at each edge, as shown in Fig. 3, and the other portion, $f$, being a plate, as shown in Fig. 4, adapted to close the space between the two bent-up edges $e$ of the plate $d$, and is soldered or brazed thereto. The blades are attached to a body, $a$, one projecting at each end, as shown in Fig. 1. The body portion $a$ is of a size to fit and slide within the handle, and is provided with a locking-pin, $h$, which enters an opening, $l$, when the blades are both within the handle. Sufficient side-play in the handle is allowed to permit the locking-pin $h$ to escape from the hole $l$ when forced toward the spring $g$. The action of the spring forces the body $a$ toward the slotted side of the handle and holds it in that position until compressed by the finger or thumb being placed upon the finger-piece $j$. This, as stated, frees the locking-pin and allows the body to be moved to present either the erasing-blade $b$ or cutting-blade $c$ from the handle, as may be desired.

I do not broadly claim the combination of a hollow handle and sliding blades, as I am well aware such device has been heretofore made.

What I claim, and desire to secure by Letters Patent, is—

1. A combined knife and eraser, consisting of a hollow handle formed of the parts $d$ and $f$, and having a slot, $o$, in combination with a body, $a$, constructed to slide within the handle, and having blades $b$ $c$ and finger-piece $j$, substantially as shown.

2. The hollow handle, in combination with sliding blades, flat spring $g$, arranged to bear against the side of the blade, and finger-piece $j$, substantially as shown.

3. The combination of the sliding blades having a finger-piece and locking-pin with a handle having open ends and a locking-pin recess or opening, substantially as shown.

4. A body, $a$, having two blades made integral therewith, in combination with an open-ended handle and finger-piece and locking means, and a flat spring fixed to handle and arranged to bear against the part $a$, substantially as shown.

THOMAS HOLDSWORTH.

Witnesses:
E. C. MANTER,
GEO. H. CHAMBERLAIN.